(12) United States Patent
Montenegro et al.

(10) Patent No.: US 12,093,655 B1
(45) Date of Patent: Sep. 17, 2024

(54) SYSTEMS AND METHODS FOR COMMUNICATION PROSTHETIC

(71) Applicant: Wells Fargo Bank, N.A., San Francisco, CA (US)

(72) Inventors: Dennis E. Montenegro, Concord, CA (US); Christopher Rotchford, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 346 days.

(21) Appl. No.: 17/398,683

(22) Filed: Aug. 10, 2021

(51) Int. Cl.
G06F 40/35 (2020.01)
G06F 3/0484 (2022.01)
G10L 15/22 (2006.01)
G06F 40/58 (2020.01)

(52) U.S. Cl.
CPC ............ G06F 40/35 (2020.01); G06F 3/0484 (2013.01); G10L 15/22 (2013.01); *G06F 40/58* (2020.01); *G10L 2015/225* (2013.01)

(58) Field of Classification Search
USPC .............................. 704/9, 246, 247, 251, 252
See application file for complete search history.

(56) References Cited

U.S. PATENT DOCUMENTS

| | | | |
|---|---|---|---|
| 10,181,213 B2 | 1/2019 | Bullivant et al. | |
| 11,461,952 B1 * | 10/2022 | Bosnak | G06V 20/20 |
| 2013/0257877 A1 * | 10/2013 | Davis | G06N 3/006 |
| | | | 345/473 |
| 2017/0237786 A1 * | 8/2017 | Crowe | H04L 65/403 |
| | | | 709/204 |
| 2021/0382544 A1 * | 12/2021 | Butcher | G06T 7/246 |
| 2022/0124286 A1 * | 4/2022 | Punwani | G06F 3/04815 |
| 2022/0405994 A1 * | 12/2022 | Okina | G06Q 10/101 |

OTHER PUBLICATIONS https://kmarshack.com/2018/05/04/how-to-speak-to-your-aspie-so-they-listen-and-understand/.
https://www.healthline.com/health/autism/dear-neurotypical-guide-to-autism#5 .-Instruct-us-but-nicely.
https://www.kennethrobersonphd.com/communicating-effectively-aspergers-partner-five-important-suggestions/.
https://www.mayinstitute.org/news/acl/asd-and-dd-adult-focused/tips-for-talking-to-adults-on-the-autism-spectrum/.

* cited by examiner

*Primary Examiner* — Leonard Saint-Cyr
(74) *Attorney, Agent, or Firm* — Foley & Lardner LLP (57) ABSTRACT

A system includes a computing system that includes a network interface coupled to a processing circuit configured to receive a first input feed from a first user device and a second input feed from a second user device and to provide a first communication interface to the first user via the first user device and a second communication interface to the second user via the second user device. The first communication interface comprises video of the second user and a second user avatar. The second communication interface comprises video of the first user and a first user avatar. The processing circuit further monitors the input feeds, analyzes the first input feed using an artificial intelligence model to identify a condition of the first user, and provides the second user a notification via the first user avatar regarding the first user based on the condition of the first user.

21 Claims, 5 Drawing Sheets

SYSTEMS AND METHODS FOR COMMUNICATION PROSTHETIC

TECHNICAL FIELD

The present disclosure relates to communication prosthetic systems and methods. More specifically, the present disclosure relates to utilizing a trained artificial intelligence (AI) system to analyze body language (e.g., facial expressions body posture, gestures), and among other features, providing a communication prosthetic to beneficially assist conversations between two or more people.

BACKGROUND

Many people have different speaking styles and communication skills making it difficult for one person to portray and understand the sentiment of the other person. This type of communicative road block can be due to neurodiversity between the two or more people holding the conversation, a language barrier, a disability, etc. A communication prosthetic would be desirable.

SUMMARY

One embodiment relates to a system including a computing system including a network interface and a processing circuit. The network interface is structured to facilitate communication with two or more user devices via a network. The processing circuit comprises a processor and a memory storing instructions that, when executed by the processor, cause the processing circuit to receive a first input feed from a first user device and a second input feed from a second user device, where the first input feed comprises video and audio of a first user, and where the second input feed comprises video and audio of a second user. The instructions further cause the processing circuit to provide a first communication interface to the first user via the first user device and a second communication interface to the second user via the second user device, where the first communication interface comprises the video of the second user and a second user avatar, and where the second communication interface comprises the video of the first user and a first user avatar. The instructions further cause the processing circuit to monitor the first input feed and the second input feed, analyze the first input feed using an artificial intelligence model to identify a condition of the first user, and provide the second user a notification on the second communication interface via the first user avatar regarding the first user based on the identified condition of the first user.

Another embodiment relates to a system including a computing system including a network interface and a processing circuit. The network interface is structured to facilitate communication with two or more user devices via a network. The processing circuit comprises a processor and a memory storing instructions that, when executed by the processor, cause the processing circuit to receive a first input feed from a first user device and a second input feed from a second user device, where the first input feed comprises video and audio of a first user, and where the second input feed comprises video and audio of a second user. The instructions further cause the processing circuit to provide a first communication interface to the first user via the first user device and a second communication interface to the second user via the second user device, where the first communication interface comprises the video of the second user and a second user avatar, and where the second communication interface comprises the video of the first user and a first user avatar. The instructions further cause the processing circuit to monitor the first input feed and the second input feed, analyze the first input feed using an artificial intelligence model to determine that the first user has misunderstood the second user, and output, on the first user device via the second user avatar, an intended message of the second user based on determining that the first user has misunderstood the second user.

Another embodiment relates to a system including a computing system including a network interface and a processing circuit. The network interface is structured to facilitate communication with two or more user devices via a network. The processing circuit comprises a processor and a memory storing instructions that, when executed by the processor, cause the processing circuit to receive a first input feed from a first user device and a second input feed from a second user device, where the first input feed comprises video and audio of a first user, and where the second input feed comprises video and audio of a second user. The instructions further cause the processing circuit to provide a first communication interface to the first user via the first user device and a second communication interface to the second user via the second user device, where the first communication interface comprises the video of the second user and a second user avatar, and where the second communication interface comprises the video of the first user and a first user avatar. The instructions further cause the processing circuit to monitor the first input feed and the second input feed, analyze the first input feed using an artificial intelligence model to determine a confidence level regarding the first user's understanding of the second user, and output, on the second user device, an indication of the confidence level, wherein the confidence level indicates a likelihood of the second avatar interjecting to reconcile the first user's understanding of the second user.

This summary is illustrative only and is not intended to be in any way limiting. Other aspects, inventive features, and advantages of the devices or processes described herein will become apparent in the detailed description set forth herein, taken in conjunction with the accompanying Figures, wherein like reference numerals refer to like elements.

DETAILED DESCRIPTION

Referring generally to the Figures, systems and methods for generating and training an avatar as well as providing and monitoring a communication interface are shown and described according to various embodiments herein. The systems and methods of the present application enhance the ability of users to effectively communicate utilizing a communication interface.

The present disclosure discloses a system to provide a user (e.g., neuro-diverse user) with the ability to communicate effectively with another user by utilizing a trained artificial intelligence model to assist the user in communication. For example, a user may not be able to recognize non-verbal cues such as facial expressions, hand gestures, etc. In another example, a user may not be able to recognize verbal cues such as audible sounds including spoken words, other sounds made by another user, tone of voice, etc. (e.g., aggressive language, defensive language, "what?," "I don't understand," "I agree"). In this instance the communication interface may provide verbal and/or textual notifications as a form of communication prosthetic. The computer system providing the communication interface is structured to provide the monitoring and analysis services. Beneficially, by the computer system providing the additional services, enhanced computing ability by the user device is not required.

Figure 1:
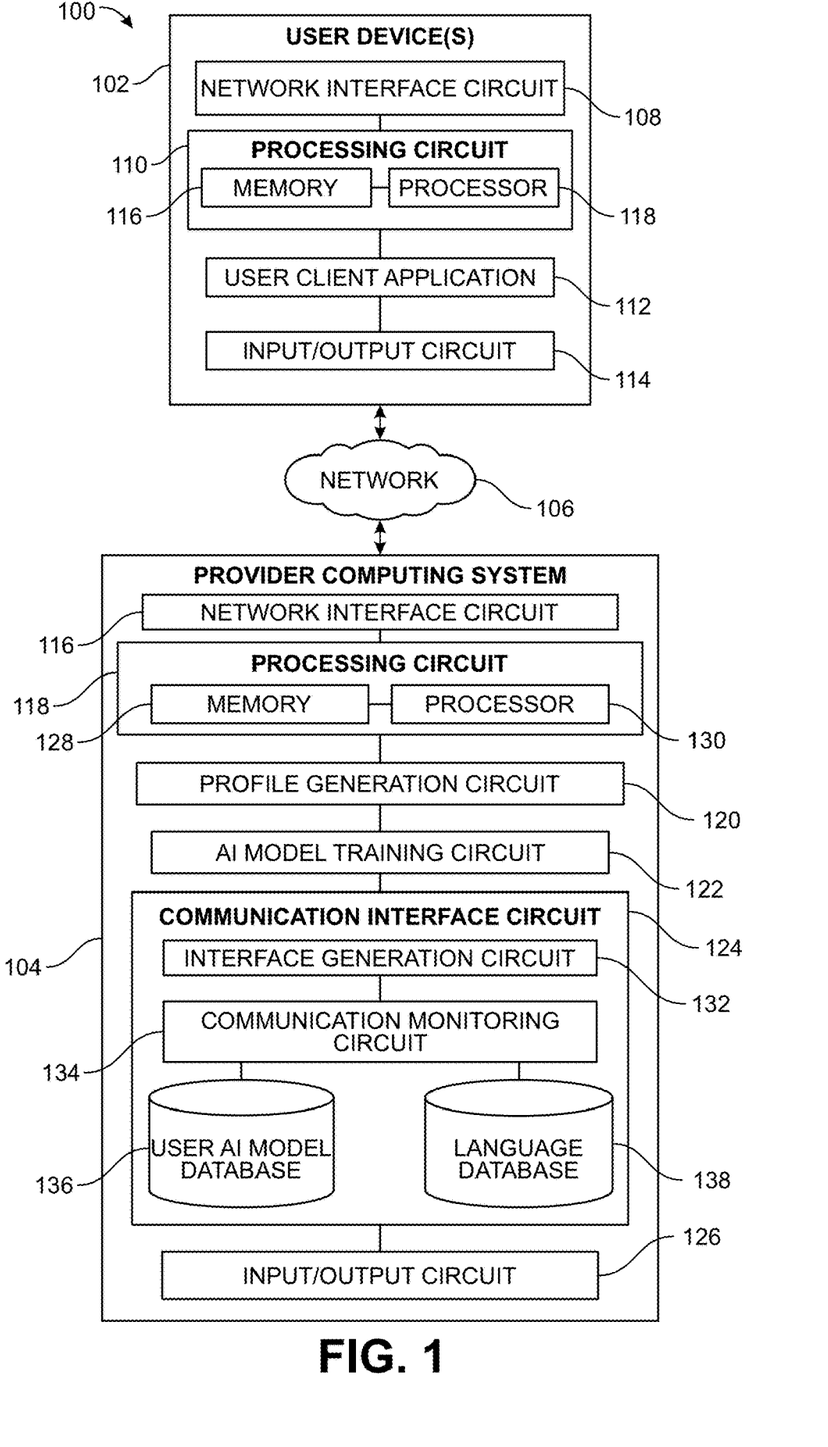
FIG. 1 is a block diagram of a of a communication prosthetic computing system.

Referring now to FIG. 1, a block diagram of a communication prosthetic computing system 100 for providing a communication interface and monitoring the conversation between two or more people is shown. The system 100 includes a user device 102 coupled to a provider computing system 104 via a network 106.

The user device 102 may be a computing device, such as a wearable or non-wearable computing device. Wearable computing devices refer to any type of device that an individual wears including, but not limited to, a watch (e.g., a smart watch), glasses (e.g., eye glasses, sunglasses, smart glasses, etc.), bracelet (e.g., a smart bracelet), etc. The user device 102 may also be other types of computing devices including, but not limited to, a phone (e.g., smart phone), a tablet, a laptop, a desktop computer, a personal digital assistant, etc.

The user device 102 is shown to include a network interface circuit 108, a processing circuit 110, a user client application 112, and an input/output circuit 114. The network interface circuit 108 is configured to couple to and establish connections with other computing systems via the network 106. The network interface circuit 108 includes program logic that facilitates connection of the user device 102 to the network 106. For example, the network interface circuit 108 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 116 includes the hardware and machine-readable media sufficient to support communication over multiple channels of data communication. Further, in some arrangements, the network interface circuit 108 includes cryptography capabilities to establish a secure or relatively secure communication session in which data communicated over the session is encrypted.

To provide certain functions of the user device 102, the network interface circuit 108 provides a relatively high-speed link to the network 106, which may be any combination of a local area network (LAN), an intranet (e.g., a private banking or retailer network), the Internet, or any other suitable communications network, either directly or through another external interface.

The processing circuit 110 includes a memory 116 coupled to a processor 118. The memory 116 includes one or more memory devices (e.g., RAM, NVRAM, ROM, Flash Memory, hard disk storage) that store data and/or computer code for facilitating the various processes described herein. That is, in operation and use, the memory 116 stores at least portions of instructions and data for execution by the processor 118 to control the functionality of the processing circuit 110. Moreover, the memory 116 may be or include tangible, non-transient volatile memory or non-volatile memory. The processor 118 may be implemented as one or more processors, application specific integrated circuits (ASICs), field programmable gate arrays (FPGAs), digital signal processors (DSPs), groups of processing components, or other suitable electronic processing components. As such, the user device 102 is configured to run a variety of application programs and store associated data in a database of the memory 116. One such application may be the user client application 112.

The user client application 112 may be provided by, hosted by, or otherwise coupled to the provider computing system 104. The user client application 112 is communicably coupled via the network interface circuit 108 over the network 106 to the provider computing system 104. The user client application 112 may be downloaded by the user device 102 prior to its usage. The mobile application can be hard coded into the memory 116 of the user device 102, or be a web-based interface application such that the user device 102 may provide a web browser to the application, which may be executed remotely from the user device 102. In the latter instance, the user may have to log onto or access the web-based interface before usage of the application. Further, and in this regard, the user client application 112 may be supported, at least partly, by a separate computing system including one or more servers, processors, network interface circuits, etc. that transmit certain features and functionalities to the user device 102. In certain embodiments, the user client application 112 includes an application programming interface (API) and/or a software development kit (SDK) that facilitate the integration of other applications with the user client application 112. In the example shown, the user client application 112 is downloaded to the user device 102, stored by the memory 116, and executed by the processor 118.

The user client application 112 is structured to generate graphical user interfaces depicting fields that enable the user to provide log-in credentials, and further gain access to the user client application 112. The fields can be free fields, single line text fields, etc. The log-in credentials can include a username and password, a payment account number and personal identification number (PIN), biometric scan (e.g., face identification, finger print identification), etc. In one embodiment, a field is provided on a graphical user interface generated by the user client application 112 for receiving a log-in credential. The user client application 112 is further structured to cross-reference the received log-in credentials with log-in credentials stored in memory 116. For example, multiple users may have accounts with the user client application 112. Credentials for each user are stored in the memory 116. Upon receiving credentials, the user client application 112 cross-references or searches the stored credentials for a match. Based on a match of received and stored credentials, that user is successfully authenticated into the user client application 112. The user client application 112 can determine an unsuccessful log-in by an inability to identify and match the received log-in credentials with stored log-in credentials. The user client application 112 is structured to generate graphical user interfaces depicting fields that enable the user to create log-in credentials.

The user client application 112 is structured to generate graphical user interfaces that provide a user the ability to provide user information to a provider. The provider can be a communications technology company, financial institution, etc. In one embodiment, the provider can be a financial institution. In this instance, the user information can be added to an existing account the user has with the financial institution. It should be appreciated that this is an example embodiment and many other providers and profile configurations are possible.

The graphical user interfaces generated by the user client application 112 that provide the user with the ability to provide user information to the provider can include a number of questions (e.g., multiple choice, check box, textual response). The questions can include questions to determine general user information (e.g., name, age) and/or communication information (e.g., email address, phone number). The questions can include one or more questions that determine if the user self-identifies as neuro-diverse. As used herein, "neuro-diverse" refers to a variation in the human brain regarding sociability, learning, attention, mood, and other mental functions whether non-pathological or pathological, including neurodiversity caused by diseases, disorders, and conditions (e.g., Autism Spectrum Disorder (ASD), Attention Deficit Hyperactivity Disorder (ADHD), Alzheimer's disease, Down Syndrome). In some embodiments, the user can provide a particular condition and/or identify as neuro-diverse. The questions can include one or more questions that determine the preferred spoken language of the user and/or regional dialect of the user. The questions can include one or more questions to determine if the user requests an avatar for future communications with a provider representative of other users.

The user client application 112 is structured to receive responses to the questions and transmit the user information and/or request of an avatar to the provider computing system 104. The user client application 112 is structured to receive a test from the provider computing system 104. The test can be a test, a survey, questionnaire, assessment, etc. The test can be generated by the provider computing system 104 based on the transmitted user information. The user client application 112 is structured to provide the test to the user via the user device 102.

In one embodiment, the test can comprise one or more classical cognitive assessments such as, for example, the Montreal Cognitive Assessment (MoCA), Kokmen Short Test of Mental Status (STMS), Folstein Mini-Mental State Exam (MMSE), etc. In some embodiments, the user can provide a score or scores received on the one or more assessments from previously performed assessments/examinations.

In some embodiments, the test can include providing images and/or videos that are meant to illicit a particular reaction (e.g., happiness, sadness, fear, excitement). Based on the provided image or video, the user client application 112 can request the user to provide an experienced reaction by a text input, check box, drop down menu, multiple choice question, etc. The images and/or videos may be used to determine the ability of the user to recognize facial expressions, understand sarcasm, remember and or understand details in the short term, etc. For example, an image of a person smiling can be presented to the user via the user device 102 followed by a question eliciting the perceived emotion of the user to determine if the user can determine non-verbal cues, such as facial expressions. In another example, a video or audio of a person using sarcasm or telling a joke can be provided to the user via the user device 102 followed by a question eliciting a perceived message by the user (e.g., the speaker was joking, the speaker was serious) to determine if the user understood that the recorded video or audio was using sarcasm or telling a joke.

In some embodiments, the user client application 112 can utilize a camera of the user device 102 to determine facial expressions of the user and/or track where the user looks on the screen when provided with images and/or videos via a display of the user device 102. The utilization of the camera may be in combination or separate from the above-referenced tests. In some embodiments, the user client application 112 can record the reaction of the user after being presented with images and/or videos that are meant to illicit a particular reaction (e.g., happiness, sadness, fear, excitement). The use of the camera to determine facial expressions can be used to indicate the ability of the user to perceive non-verbal cues and/or contextual cues. The use of the camera to determine facial expressions can be used to indicate the ability of the user to display facial expressions that are representative of their emotions. In one embodiment, the user client application 112 can present the user with an image or video and provide the user with a graphical user interface to indicate a perceived and/or experienced emotion as well as recording the facial expression of the user to see if the experienced emotion and facial expression are or are not congruent. For example if the user indicated that they were happy but their facial expression indicated a different emotion, the experienced emotion and facial expression would not be congruent.

In some embodiments, the user client application 112 can track the eye movement of the user utilizing a camera of the user device 102 to determine where the user is looking on the display. In some embodiments, the user client application 112 can provide the user with images and/or videos of people making non-verbal cues (e.g., facial expressions, hand gestures). Based on the location of the screen in which the user is looking, the ability of the user to interpret non-verbal cues can be determined. In some embodiments, the user client application 112 can provide the user with images and/or videos and track the eye movement of the user to determine the ability of the user to maintain their attention to the provided image or video for an extended period of time. The above identified tests are example configurations and many other configurations are possible. The user client application 112 is further structured to transmit the received test data and/or test results to the provider computing system 104.

The user client application 112 is structured to provide the user via a display of the user device 102, a graphical user interface to select and/or generate an avatar to represent the user and/or assist in later conversations. In one embodiment, the user client application 112 receives a plurality of avatars from the provider computing system 104. The user client application 112 may provide the plurality of avatars to the user via the display of the user device 102 and determine a selection made by the user. In some embodiments, the user client application 112 provides a graphical user interface that allows the user to create an avatar by selecting defining physical features (e.g., facial structure, nose, eyes, skin color, eye color, hair color).

In some embodiments, the user client application 112 is structured to scan the face of the user utilizing a camera of the user device 102. Based on the facial scan, the user client application 112 may generate an avatar with facial features similar to those of the user. The user client application 112 is structured to transmit the selected, generated, and/or modified avatar to the provider computing system 104.

The user client application 112 is further structured to provide a communication interface to the user via a display of the user device 102. In some embodiments, the communication interface, as described herein, can be used to host a conversation (also referred to as a communication) between the provider computing system 104 and the user. This can be beneficial as a communication between the user and the provider computing system 104 can be used to train an artificial intelligence (AI) model to be used as a prosthetic in future communications with a provider representative and/or other users. In some embodiments, the communication interface, as described herein, can be used to host a communication between the user and a provider representative and/or other users utilizing additional user devices 102. To provide the communication interface, the user client application 112 may be communicably coupled via the network 106 to the provider computing system 104, thus providing instantaneous or nearly instantaneous communication of audio and/or video from the user device 102 to the provider computing system 104 and vice versa. The communication interface can be generated by the user client application 112 or provided by the provider computing system 104.

The input/output circuit 114 is structured to receive communications from and provide communications to the user associated with the user device 102. In this regard, the input/output circuit 114 is structured to exchange data, communications, instructions, etc. with an input/output component of the user device 102. Accordingly, in one embodiment, the input/output circuit 114 includes an input/output device. In another embodiment, the input/output circuit 114 includes communication circuitry for facilitating the exchange of data, values, messages, and the like between an input/output device and the components of the user device 102. In yet another embodiment, the input/output circuit 114 includes machine-readable media for facilitating the exchange of information between an input/output device and the components of the user device 102. In still another embodiment, the input/output circuit 114 includes any combination of hardware components, communication circuitry, and machine-readable media.

In some embodiments, the input/output circuit 114 comprises suitable input/output ports and/or uses an interconnect bus (not shown) for interconnection with a local display (e.g., a touchscreen display) and/or keyboard/mouse devices (when applicable), or the like (e.g., camera, microphone, speaker), serving as a local user interface for programming and/or data entry, retrieval, or manipulation purposes. That is, the input/output circuit 114 provides an interface for the user to interact with various applications (e.g., the user client application 112) stored on the user device 102. In some embodiments, the input/output circuit 114 is structured to determine a location of the user device 102 utilizing a global positioning system (GPS), or any other type of location positioning system.

As shown in FIG. 1, the communication prosthetic computing system 100 includes a provider computing system 104. The provider computing system 104 may be structured to receive and store user information, generate a user specific AI model, as well as provide and monitor one or more communication interfaces. The provider computing system 104 is a computing system owned, associated with, or otherwise operated by a provider (e.g., financial institution, communication technology company).

The provider computing system 104 is structured as a backend computing system, such as a discrete server, a group of two or more computing devices/servers, a distributed computing network, a cloud computing network, and/or any other type of computing system capable of accessing and communicating using local and/or global networks (e.g., the network 106). The provider computing system 104 includes a network interface circuit 116, a processing circuit 118, a profile generation circuit 120, an AI model training circuit 122, communication interface circuit 124, and an input/output circuit 126.

The network interface circuit 116 includes program logic that facilitates coupling of the provider computing system 104 to the network 106. The network interface circuit 116 can support communication between the user device 102 and the provider computing system 104. For example, the network interface circuit 116 can include a cellular modem, a Bluetooth transceiver, a radio-frequency identification (RFID) transceiver, and a near-field communication (NFC) transmitter. In some embodiments, the network interface circuit 116 includes the hardware and machine-readable media sufficient to support communication over multiple channels of data communication. Further, in some embodiments, the network interface circuit 116 includes cryptography capabilities to establish a secure or relatively secure communication session between the user device 102 and the provider computing system 104. In this regard, information (e.g., user personal information, user personally identifiable information) may be encrypted and transmitted to prevent or substantially prevent a threat of hacking.

The processing circuit 118 includes a memory 128 coupled to a processor 130. As shown in FIG. 1, the memory 128 is separate from the user AI model database 136 and the language database 138. In other embodiments, the memory 128 may include the user AI model database 136 and the language database 138. The user AI model database 136 is configured to retrievably store user information (e.g., user profile) received from the user device 102 as well as AI models trained for individual users, as described herein. In this regard, the user AI model database 136 is configured to store user information and user communication information (e.g., communicative tendencies, communicative abilities). The language database 138 is configured to retrievably store language information. Language information can include translations of languages, cues for specific regional dialects, cues for regional accents, regional idioms, etc. In this regard, the language database 138 is configured to store cues indicating a regional accent or dialect, and translations of languages or regional idioms.

The processor 130 may be implemented as one or more application-specific integrated circuits (ASICs), field-programmable gate arrays (FPGAs), a group of processing components, or other suitable electronic processing components. The memory 128 may be one or more devices (e.g., RAM, ROM, Flash memory, hard disk storage) for storing data and/or computer code for completing and/or facilitating the various processes described herein. The memory 128 may be or include non-transient volatile memory, non-volatile memory, and non-transitory computer storage media. The memory 128 may include database components, object code components, script components, or any other type of information structure for supporting the various activities and information structures described herein. The memory 128 may be communicably coupled to the processor 130 and include computer code or instructions for executing one or more processes described herein. In some embodiments, the provider computing system 104 is a distributed computing system and includes one or more servers. In this case, provider computing system 104 may include multiple network interface circuits 116 and/or multiple processing circuits 118.

The profile generation circuit 120 is structured to receive user information (e.g., name, phone number, age, email address, self-identified neurodiversity, language information) as well as test results/data from the user device 102 and create a user profile. The user profile can include user personal information, as disclosed herein. The user profile can include a score or series of scores relating to the communicative abilities of the user. For example, the user can receive an overall score indicating the ability of the user to recognize non-verbal cues, contextual cues (e.g., understand when someone is joking/using sarcasm), etc. In another example, the user can receive scores in particular tested categories (e.g., recognizes facial expressions, recognizes sarcasm). The scores can be numerical scores (e.g., 1-10, 1-100), a binary score (e.g., yes, no), descriptive score (e.g., well, very well, excellently), etc. In some embodiments, the scores can be used to generate notes for a person the user is communicating with prior to the conversation initiating (e.g., Jeff has difficulty picking up on contextual cues, please speak literally and avoid sarcasm). The profile can include information about particular non-verbal cues the user exhibits during conversation based on particular emotions (e.g., stimming). For example, the profile can include a statement about the non-verbal cues of the user such as "when the user begins to rock forward and backward the user is either very excited or very nervous."

The AI model training circuit 122 is structured to train an AI model based on the individual user. The AI model training circuit 122 may utilize a stock conversational AI model and train the model based on the user profile (including test results and/or user information) to create an individually trained AI model. The stock conversational AI model can recognize user speech and general non-verbal cues (e.g., smiling, furling of eye brows, thumbs up, shoulder shrugging). The stock AI model may be originally trained based on recorded conversations and/or conversational training data (e.g., from a third-party company specializing in conversational and/or emotional intelligence).

In some embodiments, the stock AI model can be trained utilizing test data and/or test results from the user device 102 to create an individualized AI model. For example, the AI model training circuit 122 may utilize a recorded image and/or video of the user after being presented with a particular image or video that is meant to elicit a particular emotion to train the individualized AI model to interpret any irregular non-verbal cues the user displays during a conversation.

In some embodiments, the individualized AI model can be trained further by the provider computing system 104 via the AI model training circuit 122 by initiating a conversation between the individualized AI model utilizing the avatar as selected or generated by the user and the user via the user device 102. In some embodiments, the AI model training circuit 122 can determine an individualized AI model is not required based on the test results of the user indicating that a stock conversational AI model would be sufficiently effective. In some embodiments, the conversation between the individualized AI model and the user can be a scripted conversation such that the AI model training circuit 122 may be able to gage the response of the user in comparison with what is determined to be a typical response. In some embodiments, the individualized AI model via the AI model training circuit 122 is structured to respond to user responses such that the conversation between the individualized AI model and the user can be unscripted and change depending on user responses.

In some embodiments, the conversation between the user and the individualized AI model is structured to determine what non-verbal cues and/or contextual cues the user can and cannot recognize. For example, the individualized AI model can provide particular non-verbal cues (e.g., smile, frown, wink, shoulder shrug) via the avatar and determine based on the response by the user if the user recognized the non-verbal cue. In another example, the individualized AI model can determine, based on the response of the user, if the user can recognize contextual cues by using sarcasm, telling a joke, using an idiom, etc.

In some embodiments, the goal of the training of the individualized AI model is for the model to correctly determine which cues (e.g., non-verbal, contextual) the user will and will not recognize. In some embodiments, to determine this, the individualized AI model may provide the user with particular cues and determine based on the response of the user if the user recognized the particular cue, as described above. In some embodiments, the individualized AI model can determine a confidence level based on the confidence the individualized AI model has in the ability of the individualized AI model to determine the response of the user. For example, in some instances, the confidence level may be a percentage likelihood of a correct determination of the response of the user, a numerical confidence score (e.g., a confidence score between one and ten) of a correct determination, a descriptive confidence score (e.g., low, medium, high), and/or a color scale (e.g., red for low confidence, yellow for medium confidence, green for high confidence) of a correct determination. In some embodiments, if the confidence level is below a predetermined level (e.g., 50%, 5, medium, yellow), the AI model training circuit 122 can provide the user with a question as to whether the user recognized the particular cue. Based on the response to the question, the individualized AI model is trained to determine if the user recognized the particular cue.

In some embodiments, the duration of the conversation between the user and the individualized AI model can be dependent on a comprehension score of the individualized AI model. The comprehension score can be a running score based on the ability of the individualized AI model to determine which non-verbal and/or contextual cues the user may recognize. The score may be incremented if the individualized AI model correctly determines that the user will recognize a particular cue, or if the individualized AI model correctly determines that the user will not recognize a particular cue. The score may be decremented if the individualized AI model incorrectly determines that the user will recognize a particular cue, or if the individualized AI model incorrectly determines that the user will not recognize a particular cue. In some embodiments, the score is initially 10 and for the individualized AI model to be deemed as trained, the score must reach 20. This is a particular example of a scoring system and many other configurations are possible.

The communication interface circuit 124 is structured to generate and monitor a communication interface. The communication interface can be between a user and an AI model utilizing an avatar, a first user and a second user, a first user and plurality of users, etc. The communication interface circuit 124 includes an interface generation circuit 132, a communication monitoring circuit 134, a user AI model database 136, and a language database 138 which are all communicatively coupled.

In some embodiments, the communication interface circuit 124 may generate a communication interface for at least a first user and transmit the communication interface to the user device associated with the first user. The communication interface circuit 124 may monitor the communication of the at least one user utilizing the individualized AI model for the user. Monitoring can include monitoring information (e.g., video, audio) being sent to the user to determine any particular cues (e.g., non-verbal, contextual) the user may not understand. Monitoring can include monitoring information (e.g., video, audio) being sent by the user to determine a sentiment (e.g., emotion) the user is feeling that may not be conveyed by non-verbal cues, lack of understanding by the user, and/or lack of attention by the user (e.g., user is distracted or not paying attention).

The interface generation circuit 132 is structured to generate and transmit a communication interface, as described herein, to at least a first user. A communication interface, as shown in an example embodiment at FIG. 2, can present a user with a video feed of a second user and a second user avatar. The interface generation circuit 132 is structured to generate an interface based on the number of people in the communication. For example, a communication interface used to train an AI model may be configured differently than a communication interface used for a conversation between two users. In some embodiments, the interface generation circuit 132 is structured to receive video and/or audio input from a first user and transmit the video and/or audio to a second user to provide the second user with live video and/or live audio or nearly live video and/or audio of the first user and vice versa.

In some embodiments, the interface generation circuit 132 is structured to receive notes from the profile of the user that are to be presented to a second user via the communication interface prior to communication. For example, a note presented to a user may state "Jeff has difficulty picking up on contextual cues, please speak literally and avoid sarcasm." The notes can include actionable items (e.g., "avoid sarcasm") and informative items (e.g., "when excited Jeff may begin to rock forwards and backwards"). The provided notes can be presented as a way to promote a more fluid conversation between a first user and a second user.

In some embodiments, the interface generation circuit 132 can provide a notification to the user based on communication monitoring by the communication monitoring circuit 134. The notification can indicate a sentiment of a second user, a lack of understanding by the second user, and/or a lack of attention by the second user. The notification can be a text notification (e.g., pop-up window, text bubble near avatar, colored indicator) and/or a verbal interjection by an avatar. In some embodiments, prior to an interjection by an avatar, the interface generation circuit 132 can provide a warning stating that the avatar will be interjecting to provide communicative assistance (e.g., explanation, translation, reiteration). The warning can be any suitable warning method (e.g., pop-up window, text bubble near avatar, colored indicator). In some embodiments, the user can override the interjection by the avatar. For example, the user can select an icon on the communication interface indicating that the interjection is not necessary. In another example, the user can verbally override the interjection by the avatar by stating any of a number of phrases determined to override the interjection, such as "let me talk," "override," "this is not necessary," etc.

In some embodiments, the interface generation circuit 132 may provide a compatibility score (e.g., 1-10, 0%-100%, A-F) between a first and second user. The compatibility score can be determined by comparing the user profiles and or individualized AI models of the first and second user to determine the compatibility of the users based on their respective communication styles (e.g., communicative ability scores, use of contextual cues). For example, if a first user frequently uses sarcasm and speaks quickly and a second user has difficulty understanding sarcasm and requires slower speech to comprehend the information provided, the compatibility score may be low. In some embodiments, if the compatibility score between the users is initially low, a conversational score, as described herein may be lower, thus avatars may be more likely to interject early in the conversation. In some embodiments, if the communication is between a user and a provider representative and the compatibility score between the users is initially low, the user may be transferred to a second provider representative with whom the compatibility score is higher.

The communication monitoring circuit 134 is structured to monitor communication information (e.g., video, audio) received from at least one user device 102 associated with a user. The communication information is monitored by analyzing the information using an individualized AI model, also referred to as a trained AI model. The communication monitoring circuit 134 utilizing the individualized AI model can determine a sentiment of the user (e.g., content, anxious, angered), a level of understanding of the user (e.g., determine if the user does not understand), and/or a level of attention of the user (e.g., user is fidgeting, not looking at screen). Based on the analysis, the communication monitoring circuit 134 can determine if a notification should be sent to a second user via the communication interface indicating a sentiment of the user, a lack of understanding of the user, and/or a lack of attention of the user. In some embodiments, whether to send the notification can be dependent of a conversational score.

In some embodiments, based on the determined sentiment of the user, the communication monitoring circuit 134 can transmit the determined sentiment of the user to the interface generation circuit 132 such that the avatar of the user displays a typical facial expression representing the sentiment. For example, the user may rock forwards and backwards, as a form of stimming, when happy but not display the emotion using facial expressions. In this instance, the communication monitoring circuit 134, utilizing the individualized AI model can determine the user is happy and transmit the determined sentiment to the interface generation circuit 132 where the avatar can display a typical facial expression representing the determined sentiment (e.g., smile).

In some embodiments, the conversational score can be generated by an analysis of both the first user and the second user utilizing a first individualized AI model and a second individualized AI model. The conversational score can indicate a sentiment of the conversation, the level of understanding in the conversation, and/or the level of attention. For example, the sentiment can be determined by analyzing particular non-verbal cues (e.g., facial expressions, body language) and verbal cues (e.g., aggressive language, defensive language). The level of understanding can be determined by particular non-verbal cues (e.g., confused facial expressions) and verbal cues (e.g., "what?" "I don't understand,"). The level of attention can be determined by particular non-verbal cues (e.g., amount of time the user looks at the screen, nodding in response to statements) and verbal cues (e.g., "I agree"). These are example embodiments, and there are many other methods to generate a conversational score.

The communication monitoring circuit 134 is structured to analyze the received live audio from the user to determine a language spoken by the user (e.g., English, Spanish, Chinese) and/or a regional dialect (e.g., accent, general vocabulary, grammar) spoken by the user. In some embodiments, the language and/or dialect can be determined by recording the live audio received by the user, converting the live audio into a text file, and comparing converted audio against language information stored in the language database 138. In some embodiments, the accent can be determined by analyzing the particular pronunciation of words and/or the inflection in the voice of the user and comparing the determined vocal characteristics to vocal characteristics stored in the language database 138. These are example methods for determining a language and/or dialect of a user and many other methods are possible. For example, in some embodiments, the communication monitoring circuit 134 is structured to determine a user is using sign language and translate the sign language into verbal or textual communication.

The communication monitoring circuit 134 is structured to determine a language barrier between at least a first user and a second user. The language barrier can include a difference in languages spoken by the first user and the second user and/or a difference in dialect between the first user and the second user. For example, a first user may speak Spanish, and a second user may speak French. Based on the determined language barrier, the communication monitoring circuit 134 can translate the received audio and provide the translation via the avatars to the other user. In some embodiments, the translation can be provided verbally. In some embodiments, the translation can be provided in a text form. In another example, a first user may be from the United States and speak English with a northern American English dialect and a second user may be from Australia and speak English with a Queensland English dialect. Based on the determined difference in dialect, the communication monitoring circuit 134 can monitor non-verbal cues of both users to determine a misunderstanding based on particular distinctive vocabularies, pronunciations, regional idioms, etc. Upon determining a misunderstanding and/or confusion, the communication monitoring circuit 134 can interpret the received audio from one user and rephrase it based on the dialect of the other user.

In some embodiments, the communication monitoring circuit 134 is structured to determine if the user is under the influence of alcohol or drugs. The communication monitoring circuit 134 may monitor the user for slurred speech and/or other recognizable indicators of the user being under the influence. In some embodiments, the communication monitoring circuit 134 may transmit a determination of impairment to the interface generation circuit 132 to provide a notification to the user under the influence and/or other users in the conversation.

In some embodiments, the input/output circuit 126 comprises suitable input/output ports and/or uses an interconnect bus (not shown) for coupling with a local display (e.g., a touchscreen display) and/or keyboard/mouse devices (when applicable), or the like, serving as a local user interface for programming and/or data entry, retrieval, or manipulation purposes. That is, the input/output circuit 126 provides an interface for the user to interact with various circuits/applications (e.g., the profile generation circuit) stored on the provider computing system. The input/output circuit 126 can allow a provider employee to view and manipulate stored instructions and functionality of the provider computing system.

Figure 2:
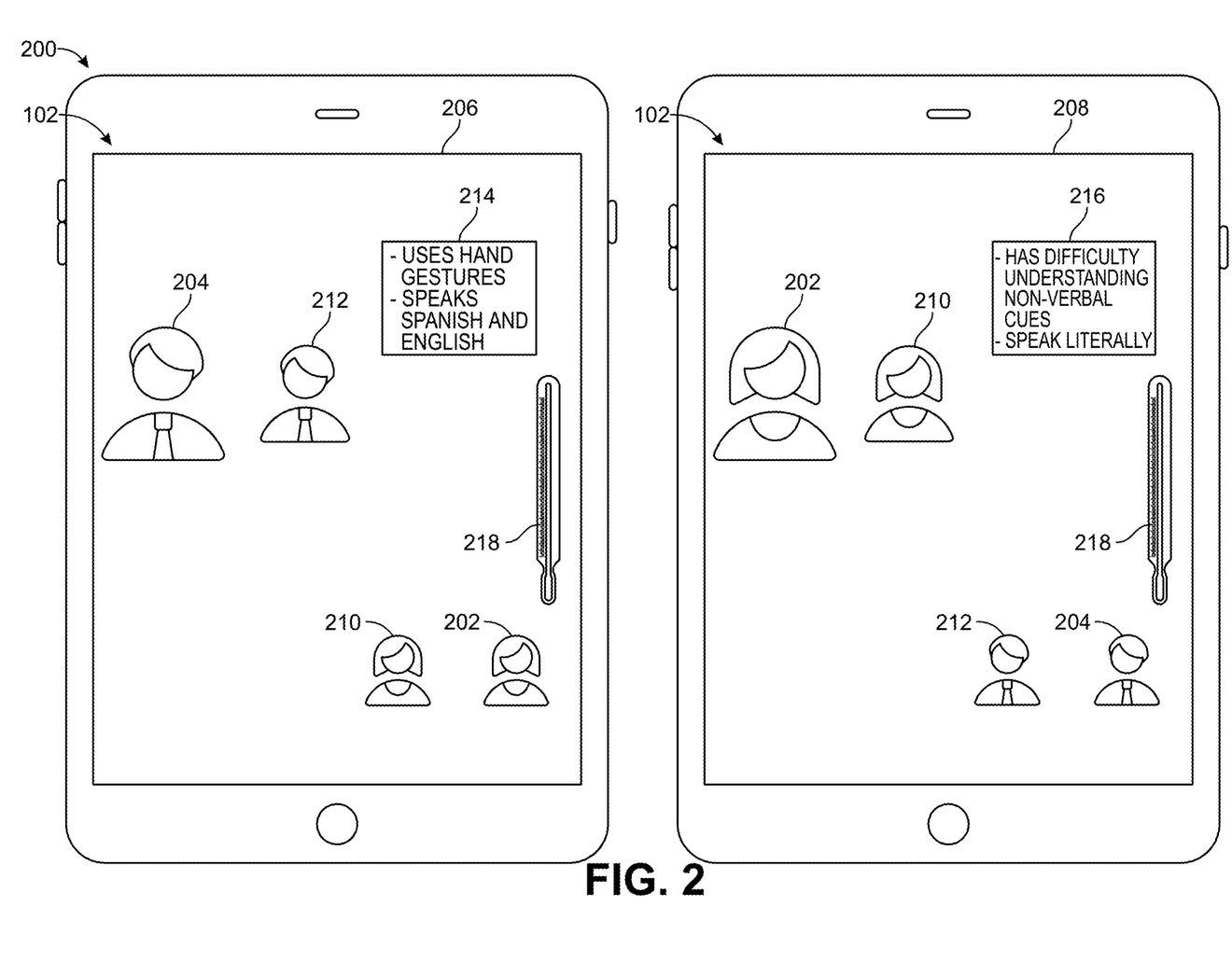
FIG. 2 is an illustration of communication interfaces.

Referring now to FIG. 2, communication interfaces 200 are shown, according to an example embodiment. The communication interfaces 200 as shown in FIG. 2 shows a first communication interface 206 and a second communication interface 208. It should be appreciated that this is an example embodiment and more than two users can be connected via the communication interfaces 200. The communication interfaces 200 is structured to provide a communication channel between at least a first user 202 and a second user 204 by providing live video and live audio or nearly live video and nearly live audio. The first communication interface 206 can be displayed to the first user 202 via a display of a first user device 102 and the second communication interface 208 can be displayed to the second user 204 via a display of a second user device 102.

In some embodiments, a first communication interface 206 can include a video feed of the second user 204, the second user avatar 212, a first notification box 214, the first user avatar 210, a video feed of the first user 202, and a conversation indicator 218 denoting the conversational score, as described herein. In some embodiments, a second communication interface 208 can include a video feed of the first user 202, the first user avatar 210, a second notification box 216, the second user avatar 212, a video feed of the second user 204, and a conversation indicator 218 denoting the conversational score, as described herein. FIG. 2 represents particular positions of the above referenced communication interface components. It should be appreciated that these components can be arranged in any suitable configuration. In some embodiments, a user can modify the components shown, the size of the components, and/or the position of the components on the communication interface. For example, a first user 202 can modify the first communication interface 206 to remove the first user avatar 210 and move the video feed of the second user 204 to a central position of the first communication interface 206. The video feed of the first user 202 and the video feed of the second user 204 can be live or nearly live video feeds.

The first user avatar 210 can be an avatar selected, modified, and/or generated by the first user 202 via the user device 102, as described herein. In some embodiments, the second user 204 may modify what the avatar looks like (design of avatar) (e.g., facial structure, hair color, skin color) and/or sounds like (e.g., particular accent, low pitch voice, high pitch voice) based on their personal preference. For example, the second user 204 may modify the first user avatar 210 to have the same design and voice as the second user avatar 212 or another design. In some embodiments, the first user avatar 210 can be modified to look like a cartoon character or animal.

The second user avatar 212 can be an avatar selected, modified, and/or generated by the second user 204 via the user device 102, as described herein. In some embodiments, the first user 202 may modify what the avatar looks like (design of avatar) (e.g., facial structure, hair color, skin color) and/or sounds like (e.g., particular accent, low pitch voice, high pitch voice) based on their personal preference. For example, the first user 202 may modify the second user avatar 212 to have the same design and voice as the first user avatar 210 or separate distinct design. In some embodiments, the second user avatar 212 can be modified to resemble a cartoon character or animal.

In some embodiments, the second user avatar 212 can display an intended sentiment (e.g., happy, anxious) of the second user 204 as determined by the communication monitoring circuit 134 and the first user avatar 210 can display an intended sentiment (e.g., happy, anxious) of the first user 202 as determined by the communication monitoring circuit 134. In some embodiments, the avatars (210 and 212) can provide audio and verbal notifications (as used herein, "verbal" notifications include any notifications provided by way of sound) as determined by the communication monitoring circuit 134. In these instances, the avatars (210 and 212) can imitate the mouth movements necessary to say the provided notification in order to indicate the notification is coming from the avatar. In some embodiments, verbal notifications can be provided by the communication interfaces 200 without a display of imitated speech by the avatars.

The first notification box 214 can be used to provide conversational notes to the first user 202 prior to or at the beginning of the conversation with the second user 204, as described herein. The conversational notes can include tips (e.g., avoid sarcasm) among other conversational notes. The first notification box 214 is structured to provide notifications as determined by the communication monitoring circuit 134 that are intended to assist understanding in the conversation. For example, a notification can indicate that the second user 204 may not have understood what the first user 202 said based on non-verbal cues of the second user 204. This is an example notification and many other notifications are possible.

The conversation indicator 218 can be any form of a visual representation of the conversational score, as described herein. For example, the conversation indicator 218 can be a scale that changes colors as the conversational score increases or decreases (e.g., red, yellow, green). When the conversation is going smoothly, the indicator 218 can show a green color. When the communication monitoring circuit 134 determines that the conversational score has decreased (e.g., minor confusion, some anxiety) the indicator 218 can show a yellow color, and when the communication monitoring circuit 134 determines that the conversational score is below a threshold value (e.g., major confusion), the indicator 218 can show a red color. In some embodiments, when the indicator 218 is a yellow color it can indicate that the avatar may step in to reconcile any issue determined. In some embodiments, when the indicator 218 is a red color, the avatar is preparing to interject or is interjecting to reconcile the determined issue. This is an example visual of the conversation indicator 218 and there are many other configurations. For example, the indicator 218 can be a thermometer, a gage with a needle or dial, a Harvey ball, etc.

Figure 3:
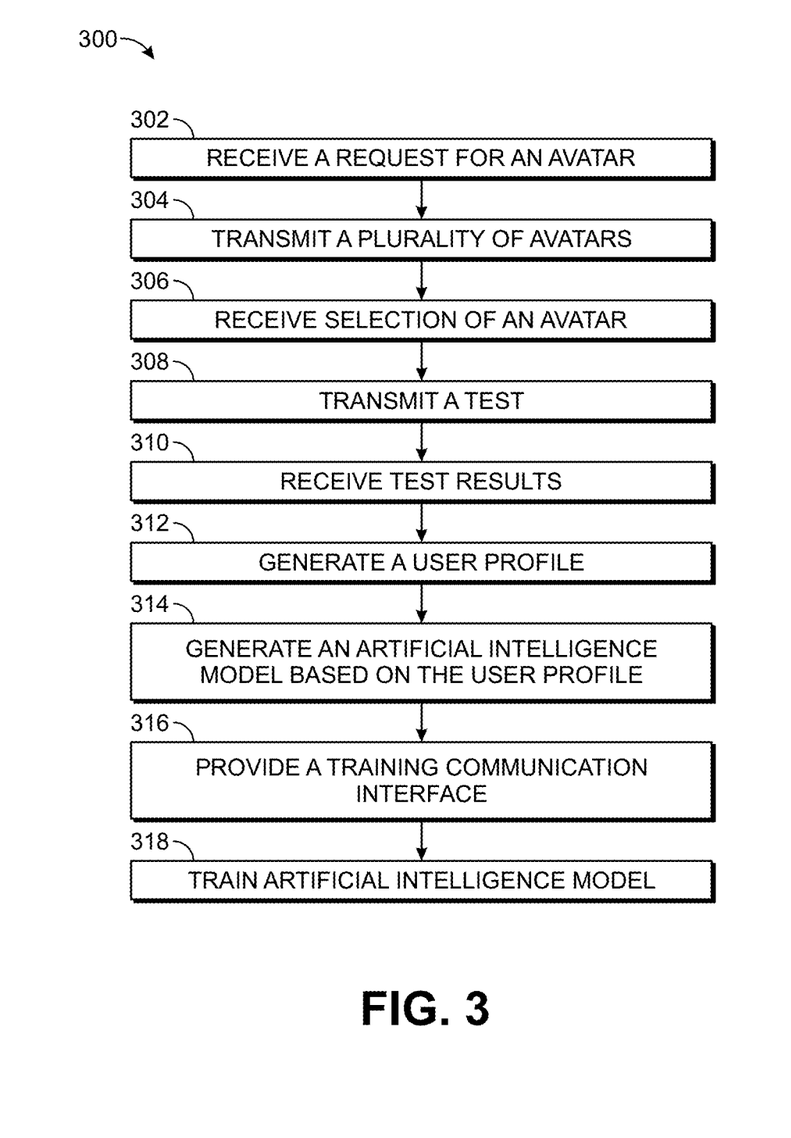
FIG. 3 is a flow diagram of a method for training an avatar.

Referring now to FIG. 3, a method for generating and training an avatar is shown according to an example embodiment. The method may be performed by the components of FIG. 1, such that reference is made to one or more components of FIG. 1 to aid explanation of the method 300. The method 300 is initiated at act 302 by the provider computing system 104 receiving a request for an avatar from a user via a user device 102 associated with the user. The request for an avatar can include user information such as, for example, name, phone number, email address, etc. In some embodiments, the avatar request can include information regarding a preferred language by the user. In some embodiments, the request can include a designation that the user self-identifies as neuro-diverse. The self-identification as neuro-diverse can be a general designation and/or include particular designations (e.g., ASD, ADHD, Alzheimer's disease).

After receiving the request for an avatar, at act 302, the provider computing system 104 may transmit a plurality of avatars to the user device 102, at act 304. The plurality of avatars can be transmitted to the user device 102 in such a way that the selectable avatars are in a graphical user interface such that the user may select an avatar via the user device 102. At act 306, the provider computing system 104 may receive the selection of an avatar by a user via the user device 102. In some embodiments, as described herein, the user may generate a custom avatar, modify a provided avatar, create an avatar with similar facial features to the user by the user device 102 completing a facial scan of the user and creating an avatar with similar features, etc.

At act 308, the provider computing system 104 transmits a test to the user device 102. As described herein, the test can include classical cognitive assessments, eye tracking tests, non-verbal cue assessments, etc. In some embodiments, the transmitted test can be a general test sent to all users that have requested an avatar. In some embodiments, the transmitted test can be based on the user self-identifying as neuro-diverse.

At act 310, the provider computing system 104 receives test results from the user device 102. In some embodiments, the test results can include test data such as, for example, recorded non-verbal cues based on a provided image or video. The test results as well as the user information received at act 302 can be combined to generate a user profile at act 312. As such, the user profile can include user information (e.g., name, phone number, email address, neuro-diverse self-identification, language preferences) as well as test results (e.g., ability to recognize non-verbal cues, ability to recognize contextual cues, attention span, exhibited non-verbal cues), a selected avatar, among other setting selections. Setting selections can include communication interface settings (e.g., components, position of components, size of components), among other setting selections.

At act 314, the provider computing system 104 generates an individualized artificial intelligence (AI) model based on the user profile. A stock conversational AI model can be modified utilizing the user information and test results of the user profile to individualize the stock conversational AI model. As such, in some embodiments, the provider computing system 104 can utilize the recorded non-verbal cues of the user in response to provided images to train the individualized AI model.

At act 316, the provider computing system 104 provides a communication interface to the user via the user device 102. The communication interface can be structured such that the user can communicate with the avatar. In some embodiments, when first presenting the communication interface to the user at act 316, the provider computing system 104 can give the user a tour of the components of the communication interface. The tour may also include how to remove/add particular components, change the size of components, and/or rearrange the components.

At act 318, the provider computing system 104 trains the individualized artificial intelligence model based on the conversation with the user via the communication interface provided to the user device. As described herein, the conversation between the avatar, utilizing the individualized AI model, and the user via the user device can be scripted and/or unscripted. The conversation can be used to train the individualized AI model to recognize non-verbal cues exhibited by the user and/or to learn which non-verbal cues and/or contextual cues the user recognizes. In some embodiments, the training conversation can continue until a predetermined training score is met. Upon the individualized AI model reaching the predetermined training score, the conversation can be completed allowing the user to utilize the avatar in later conversations with other users. The individualized AI model can be continuously trained and updated in subsequent training sessions and/or conversations between the user and other users. The training in subsequent conversations between the user and other users may analyze the user and the at least one other user to determine the ability of the user to recognize non-verbal cues and/or contextual cues. The individualized AI model may analyze the user to determine exhibited non-verbal cues in the context of a particular conversation (e.g., the user rocks forwards and backwards in happy conversations). This is a particular method for generating and training an avatar. It should be appreciated that the order of the acts and/or the acts performed can be completed in many other configurations.

Figure 4:
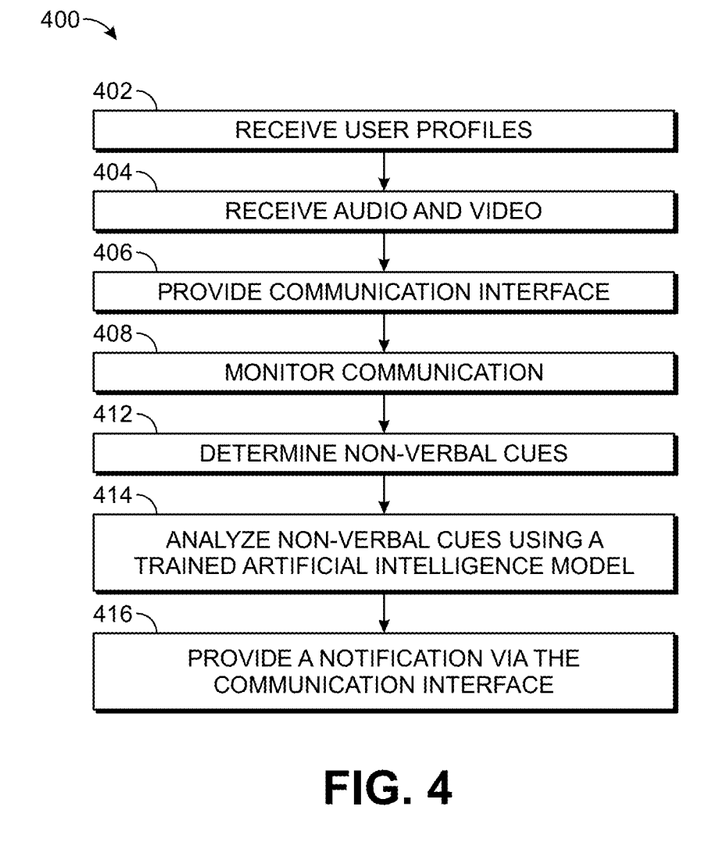
FIG. 4 is a flow diagram of a method for conversational monitoring and analysis.

Referring now to FIG. 4, a method of conversational monitoring and analysis is shown according to an example embodiment. The method may be performed by the components of FIG. 1, such that reference is made to one or more components of FIG. 1 to aid explanation of the method 400. The method 400 is initiated at act 402 by the provider computing system 104 receiving at least a first user profile and a second user profile. In some embodiments, the first user and the second user may schedule a conversation for a particular time on a particular date prior to the time and date of the scheduled conversations. In this instance, the provider computing system 104 may receive the user profiles upon confirmation by both users of the scheduled conversation. In some embodiments, a first user may request an immediate conversation, in this instance, the first user may be matched with an available second user. For example, the user may be a customer at a particular institution (e.g., financial institution) wherein the user is requesting assistance. In this instance, the user may be matched with the first available provider representative. In these embodiments, the provider computing system 104 may receive the user profiles just prior to the conversation. In some embodiments, wherein the user is matched with an available provider representative, the user profiles may be compared to determine a compatibility score, as described herein. In these instances, if the compatibility score is below a predetermined level, the user may be matched with a different provider representative.

At act 404, the provider computing system 104 receives video and audio from the user devices 102. The video and audio can be transmitted instantaneously or nearly instantaneously to provide live video and audio or nearly live video and audio to the other user(s). In some embodiments, the provider computing system 104 may receive only video or audio from the user device. For example, an audio call.

At act 406, the provider computing system 104 provides a first communication interface 206 to a first user 202, a second communication interface 208 to a second user 204, etc. As described herein, the communication interfaces 200 can provide an interface for users to host a conversation utilizing the assistance of trained artificial intelligence models. In some embodiments, the provided communication interfaces can include notes for each user to facilitate an effective conversation. For example, one user can be provided with a note saying "please speak literally, the user has difficulty recognizing contextual cues". In some embodiments, the communication interface can be provided prior to receiving video and audio from the user devices 102.

After providing the communication interfaces, the provider computing system 104 can monitor the communication between the two or more users at act 408. Monitoring can include monitoring the video from each user utilizing the individualized AI models to recognized non-verbal cues exhibited by each user. Monitoring can include analyzing phrases to determine if the user is using idioms, sarcasm, etc. In some embodiments, monitoring can include creating a transcript of the conversation in the instance that a user requests that the avatar rephrase, repeat, or translate a particular portion of the conversation.

At acts 410 and 412, the provider computing system 104 utilizing the individualized AI models can determine non-verbal cues exhibited by the users and analyze the non-verbal cues. The non-verbal cues can include facial expressions, hand gestures, body language, body movements, etc. Based on the determination and analysis of the non-verbal cues, the provider computing system 104 can determine a sentiment of each user, a level of understanding of each user, and/or a level of attention of each user.

Based on the determined sentiment, level of understanding, and/or level of attention of the users, a conversational score can be adjusted. The conversational score can be indicated by a conversation indicator 218 on the communication interfaces 200. If the conversational score is below a predetermined level, one or more avatars may provide a notification.

At act 414, the provider computing system 104 via one or more avatars can provide a notification to one or more users on the conversational interface. In some embodiments, the notification can be a verbal notification. In some embodiments, the notification can be a textual notification. The notification can be any suitable notification to assist in the conversation. For example, if a first user has difficulty recognizing non-verbal cues or contextual cues, a notification can indicate when the second user is being sarcastic or making a joke. In another example, a first user may be feeling anxious, but the second user may not recognize the non-verbal cues indicating this sentiment. In this instance, a notification may be sent to the second user prompting the second user to either move to a separate subject or explain the subject again. These are examples and many other notifications are possible to assist in a conversation.

In some embodiments, prior to the notification by the avatar(s) a warning can be provided to the one or more users. The warning can be any suitable method for indicating that the avatar will be interjecting. For example, a text box near the avatar may read "There seems to be a misunderstanding, I can clear this up." Another example could be the conversation indicator 218 being colored yellow or red. In some embodiments, the user can indicate that the assistance is not needed by selecting an icon dismissing the notification and/or verbally dismissing by saying, for example, "dismiss," "please let me speak," etc.

In some embodiments, the notification can be used to rephrase something one of the users said. For example if the user appears to be confused or verbally asks for a reiteration, the provider computing system 104 via the avatar can rephrase what the other user had previously stated. This may be beneficial if a first user has used a regional idiom that the second user did not understand. For example a first user may state "are you picking up what I'm laying down?" after this the second user may have a confused look or ask "avatar, what did they say?" to which the avatar may state, "they asked, 'do you understand?'" This is an example and there are many other possible situations in which the provider computing system 104 can be utilized to rephrase or reiterate a statement.

Figure 5:
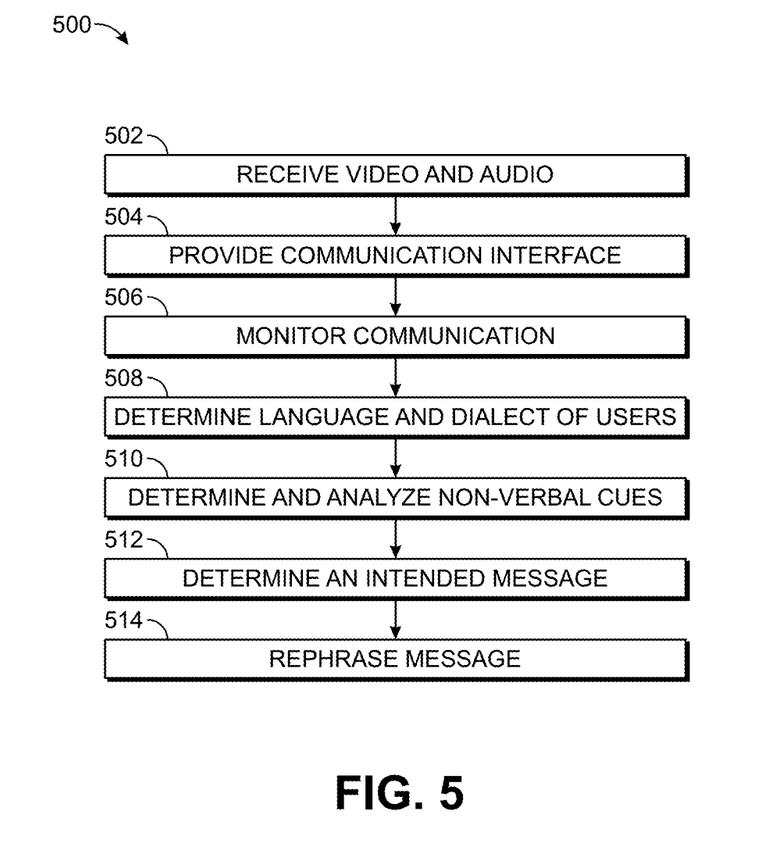
FIG. 5 is a flow diagram of a method for conversational monitoring and analysis.

Referring now to FIG. 5, a method of conversational monitoring and analysis is shown according to an example embodiment. The method may be performed by the components of FIG. 1, such that reference is made to one or more components of FIG. 1 to aid explanation of the method 500. The method 500 is initiated at act 502 by receiving video and audio from the user devices 102. The video and audio can be transmitted instantaneously or nearly instantaneously to provide live video and audio or nearly live video and audio to the other user(s). In some embodiments, the provider computing system 104 may receive only video or audio from the user device. For example, an audio call.

In some embodiments, the method 500 is initiated by the provider computing system 104 receiving at least a first user profile and a second user profile. In some embodiments, the first user and the second user may schedule a conversation for a particular time on a particular date prior to the time and date of the scheduled conversations. In this instance, the provider computing system 104 may receive the user profiles upon confirmation by both users of the scheduled conversation. In some embodiments, a first user may request an immediate conversation, in this instance, the first user may be matched with an available second user. For example, the user may be a customer at a particular institution (e.g., financial institution) wherein the user is requesting assistance. In this instance, the user may be matched with the first available provider representative. In these embodiments, the provider computing system 104 may receive the user profiles just prior to the conversation. In some embodiments, wherein the user is matched with an available provider representative, the user profiles may be compared to determine a compatibility score, as described herein. In these instances, if the compatibility score is below a predetermined level, the user may be matched with a different provider representative.

At act 504, the provider computing system 104 provides a first communication interface 206 to a first user 202, a second communication interface 208 to a second user 204, etc. As described herein the communication interfaces 200 can provide an interface for users to host a conversation utilizing the assistance of trained artificial intelligence models. In some embodiments, the provided communication interfaces can include notes for each user to facilitate an effective conversation. For example, one user can be provided with a note saying "the user is most comfortable speaking Spanish". In some embodiments, the communication interface can be provided prior to receiving video and audio from the user devices 102.

After providing the communication interfaces, the provider computing system 104 can monitor the communication between the two or more users at act 506. Monitoring can include monitoring the video from each user utilizing the individualized AI models to recognized non-verbal cues exhibited by each user. Monitoring can include analyzing phrases to determine if the user is using idioms, sarcasm, etc. In some embodiments, monitoring can include creating a transcript of the conversation in the instance that a user requests that the avatar rephrase, repeat, or translate a particular portion of the conversation. Based on monitoring the conversation and/or reviewing the user profiles, the provider computing system can determine a language spoken and/or a dialect of each user at act 508 by referencing stored language information in the language database 138.

At act 510, the provider computing system 104 utilizing the individualized AI models can determine non-verbal cues exhibited by the users and analyze the non-verbal cues. In some embodiments, the provider computing system 104 can determine and analyze non-verbal cues utilizing a stock conversational AI model. This may be beneficial as the stock conversational AI model may be sufficient for most conversations and requires less time by the user to train. The non-verbal cues can include facial expressions, hand gestures, body language, body movements, etc. Based on the determination and analysis of the non-verbal cues, the provider computing system 104 can determine a sentiment of each user, a level of understanding of each user, and/or a level of attention of each user.

Based on the determined sentiment, level of understanding, and/or level of attention of the users, a conversational score can be adjusted. The conversational score can be indicated by a conversation indicator 218 on the communication interfaces 200. If the conversational score is below a predetermined level, one or more avatars can provide a notification. For example, the provider computing system 104 may determine that a first user does not understand what a second user said. Based on the determined misunderstanding, the avatar may determine an intended message by the second user and rephrase the message such that the first user understands, as described with respect to act 512 and 514. In another example, the first user can ask the avatar to clarify what the second user said by stating, for example, "avatar, can you please clarify?" or "avatar, can you please rephrase?"

Based on a determined misunderstanding by a first user based on a statement from a second user at act 510, the provider computing system 104 determines an intended message of the second user at act 512. The intended message can be determined by analyzing the statement of the second user based on the determined language and/or dialect of the second user. For example the second user may say "that makes as much sense as government cheese" and based on the determination that the second user has a northern American dialect, the provider computing system can determine that the second user means "that is a bad idea". In another example, the second user may be speaking Spanish, and based on the determination that the second user is speaking Spanish, the provider computing system can interpret what the second user is saying.

At act 514, the provider can rephrase the message of the second user to the first user utilizing the avatar. The rephrasing can include a translation from a first language to a second language, a rephrasing of the message, or a reiteration of the message. In some embodiments, the provider computing system 104 via the avatar may translate all verbal communication between a first user and a second user based on a determination that the first user and the second user speak different languages. In some embodiments, the provider computing system 104 via the avatar may rephrase idioms based on the determined dialect of the user. In some embodiments, the provider computing system 104 may rephrase or reiterate a statement by a second user to a first user in different ways based on a received prompt by the first user. For example, if the first user asks "avatar, can you explain what the user said?" the provider computing system 104 may provide more detailed explanation to the statement made by the second user. In another example, if the user asks "avatar, can you please summarized what the user said?" the provider computing system 104 may provide a succinct explanation of the statement made by the second user. Accordingly, the rephrasing by the provider computing system 104 can be changed based on user input.

The above referenced examples of the method 500 relate to a first user and a second user. It should be appreciated that the method 500 can be utilized by more than two users.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors is structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
   a computing system comprising a network interface and a processing circuit, the network interface structured to facilitate communication with two or more user devices via a network, the processing circuit comprising a processor and a memory storing instructions that, when executed by the processor, cause the processing circuit to:
  receive a first input feed from a first user device and a second input feed from a second user device, wherein the first input feed comprises video and audio of a first user, and wherein the second input feed comprises video and audio of a second user;
  provide a first communication interface to the first user via the first user device and a second communication interface to the second user via the second user device, wherein the first communication interface comprises the video of the second user and a second user avatar, and wherein the second communication interface comprises the video of the first user and a first user avatar;
  monitor the first input feed and the second input feed;
  analyze the first input feed using an artificial intelligence model to identify a condition of the first user; and
  provide the second user a notification, on the second communication interface via the first user avatar, to inform the second user of the condition of the first user identified using the artificial intelligence model.

2. The system of claim 1 wherein the instructions, when executed by the processor, further cause the processing circuit to:
  provide, by the second user avatar, the first user with first conversation information regarding the second user based on a second user profile via the first user device; and
  provide, by the first user avatar, the second user with second conversation information regarding the first user based on a first user profile via the second user device.

3. The system of claim 1, wherein the first communication interface and the second communication interface further comprise a conversation indicator.

4. The system of claim 1, wherein the first communication interface further comprises the first user avatar, and the second communication interface further comprises the second user avatar.

5. The system of claim 1, wherein the instructions, when executed by the processor, further cause the processing circuit to:
  provide, prior to or concurrent with providing the notification, an indication that the first user avatar or the second user avatar will interject.

6. The system of claim 1, wherein the artificial intelligence model is trained based on test results from the first user and communication between the first user and the first user avatar.

7. The system of claim 1, wherein the artificial intelligence model is a first artificial intelligence model, and wherein the second input feed is analyzed using a second artificial intelligence model.

8. The system of claim 1, wherein the instructions, when executed by the processor, further cause the processing circuit to:
  determine that the first user has misunderstood the second user;
  determine an intended message of the second user; and
  output, on the first user device via the second user avatar, the intended message of the second user.

9. The system of claim 1, wherein the notification is at least one of a textual notification or an audio notification.

10. The system of claim 1, wherein the first user avatar displays an intended sentiment of the first user and the second user avatar displays an intended sentiment of the second user.

11. The system of claim 1, wherein the instructions, when executed by the processor, further cause the processing circuit to:
  train the artificial intelligence model based on the first input feed and the second input feed.

12. A system comprising:
  a computing system comprising a network interface and a processing circuit, the network interface structured to facilitate communication with two or more user devices via a network, the processing circuit comprising a processor and a memory storing instructions that, when executed by the processor, cause the processing circuit to:
  receive a first input feed from a first user device and a second input feed from a second user device, wherein the first input feed comprises video and audio of a first user, and wherein the second input feed comprises video and audio of a second user;
  provide a first communication interface to the first user via the first user device and a second communication interface to the second user via the second user device, wherein the first communication interface comprises the video of the second user and a second user avatar, and wherein the second communication interface comprises the video of the first user and a first user avatar;
  monitor the first input feed and the second input feed;
  analyze the first input feed using an artificial intelligence model to determine that the first user has misunderstood the second user; and
  output, on the first user device via the second user avatar, an intended message of the second user to assist the first user in understanding the second user.

13. The system of claim 12, wherein the instructions, when executed by the processor, further cause the processing circuit to:
  dynamically translate the audio of the first user based on a determined language spoken of the second user; and
  provide, via the second user device, a translation of the audio of the first user to the second user.

14. The system of claim 12, wherein the instructions, when executed by the processor, further cause the processing circuit to:
  provide, prior to outputting the intended message, an indication that the second user avatar will interject.

15. The system of claim 12, wherein the first communication interface further comprises the first user avatar, and the second communication interface further comprises the second user avatar.

16. The system of claim 12, wherein the first communication interface and the second communication interface further comprise a conversation indicator.

17. The system of claim 12, wherein the instructions, when executed by the processor, further cause the processing circuit to:
  analyze non-verbal cues of the first user using a first trained artificial intelligence model and non-verbal cues of the second user using a second trained artificial intelligence model; and
  provide at least one of the first user a notification via the second user avatar regarding the second user and the second user a notification via the first user avatar regarding the first user, wherein the notification indicates at least one of a sentiment, lack of understanding, and lack of attention.

18. A system comprising:
a computing system comprising a network interface and a processing circuit, the network interface structured to facilitate communication with two or more user devices via a network, the processing circuit comprising a processor and a memory storing instructions that, when executed by the processor, cause the processing circuit to:
receive a first input feed from a first user device and a second input feed from a second user device, wherein the first input feed comprises video and audio of a first user, and wherein the second input feed comprises video and audio of a second user;
provide a first communication interface to the first user via the first user device and a second communication interface to the second user via the second user device, wherein the first communication interface comprises the video of the second user and a second user avatar, and wherein the second communication interface comprises the video of the first user and a first user avatar;
monitor the first input feed and the second input feed;
analyze the first input feed using an artificial intelligence model to determine a confidence level regarding the first user's understanding of the second user;
output, on the second user device, an indication of the confidence level, wherein the confidence level indicates a likelihood of the second user avatar interjecting to reconcile the first user's understanding of the second user; and
output, on the first user device via the second user avatar and after outputting the indication of the confidence level, an intended message of the second user based on the confidence level falling below a threshold.

19. The system of claim 18, wherein the indication is an image that changes color based on the first user's understanding of the second user.

20. The system of claim 19, wherein the indication changes from a first color to a second color to indicate a higher likelihood of the second user avatar interjecting.

21. The system of claim 19, wherein the indication changes from a first color to a second color to indicate that the second user avatar is going to interject.

* * * * *